United States Patent [19]

Seccombe et al.

[11] 3,988,925

[45] Nov. 2, 1976

[54] VALVE LASH ADJUSTING TOOL AND METHOD THEREFOR

[75] Inventors: Robert J. Seccombe, Detroit; Edwin E. Rice, Ann Arbor; William F. Hurtubise, Plymouth; Ronald K. Mudge, Brighton, all of Mich.

[73] Assignee: Ingersoll-Rand Company, Woodcliff Lake, N.J.

[22] Filed: Nov. 21, 1975

[21] Appl. No.: 634,078

[52] U.S. Cl. ............................ 73/119 R; 33/180 AT; 81/3 F
[51] Int. Cl.² .......................................... G01M 15/00
[58] Field of Search ............ 73/119 R, 118; 81/3 F; 33/180 AT, 181 AT

[56] References Cited
UNITED STATES PATENTS

| | | | |
|---|---|---|---|
| 3,039,300 | 6/1962 | Phillips et al. | 73/119 |
| 3,717,053 | 2/1973 | Sturges | 81/3 F |
| 3,829,979 | 8/1974 | Stewart | 33/180 AT |

Primary Examiner—Jerry W. Myracle
Attorney, Agent, or Firm—Walter C. Vliet

[57] ABSTRACT

A tool and method for automatically adjusting internal combustion engine valve lash is disclosed. The engine is first rotated to correctly position the valve lifter cam for the individual valve which is to be adjusted. The novel tool of this invention is then positioned and sequenced through a series of operations which properly set the valve lash or preload, whichever is required. The system uses a linear variable differential transformer probe in the preferred embodiment to establish when the valve is seated. The valve lash adjusting means is advanced until the rocker arm engages the valve stem. The initial movement of the valve stem is sensed by a linear variable differential transformer and a zero reference is established at the point where the valve just begins to move. The valve lash adjusting means is then rotated out until the valve stem returns to the established zero position at which point the valve lash adjusting means is further rotated out a specified number of degrees which, utilizing the adjusting means as a micrometer, accurately sets the required valve lash.

20 Claims, 7 Drawing Figures

VALVE LASH ADJUSTING TOOL AND METHOD THEREFOR

BACKGROUND OF THE INVENTION

Internal combustion engines utilize valves for controlling the introduction of fuel to the cylinders and for exhaustion of product of combustion from the cylinders. The valves are controlled in opening and closing by a cam shaft. The cam shaft actuates a valve lifter which in turn actuates the valve stem usually through a push rod and rocker arm. It is important for purposes of valve timing, proper sealing, and engine noise to have a proper amount of clearance in the actuating linkage for engines using mechanical or solid valve lifters. Engines using hydraulic valve lifters require a proper amount of preload in the actuating linkage. With mechanical lifters, too little clearance will result in the improper sealing of the valve itself and will materially contribute to its early failure. Too much clearance will result in improper valve timing and excessive engine noise. Improper preload on hydraulic lifters cause similar problems. In the past it has been the common practice to hand-set each engine valve (generally two for each cylinder). This method involved the operator using a feeler gage inserted in the actuating mechanism to determine when the operator had properly positioned the screw adjustment. This involved great skill of the operator in determining the feeler gage clearance. If a lock nut were involved for the adjusting screw, the operation was further complicated by the need for a third hand or some compensation for the lock nut application. The above-described manual techniques are generally considered unsatisfactory for modern engine assembly technique. Several attempts have been made to develop an automatic valve lash adjusting tool. However, to date none have been completely successful. Our invention takes full advantage of position control techniques of modern assembly line practices which will produce satisfactory tolerances and discloses a tool and method which takes unique advantage of these features.

SUMMARY OF THE INVENTION

The object of this invention is to provide a method and apparatus for sutomatically adjusting the valve lash of an internal combustion engine. The invention makes use of modern assembly line practice, tolerances, and techniques. The method utilizes, as well as assures, positive cam shaft orientation, positive seating of the valve, and positive seating of linkages to provide a zero lash reference point for making the adjustment. A further object of this invention is to make use of the threaded adjustment designed into most valve-actuating mechanisms as a means of controlling the amplitude of adjustment. Another object of this invention is to provide a modern production system which will automatically sequence and accomplish the steps necessary to carry out the unique valve lash adjusting method disclosed. It is the further object of this invention to provide a tool which will unlock an adjusting screw lock nut, rotate the adjusting thread using an accurate driving means to the point of zero lash, establish the point of zero lash point as a zero reference, and thereafter accurately rotating the screw from the zero reference a specified number of degrees to accurately establish the desired lash, or preload condition in the valve train. In general, these and other objects are met in a valve lash adjusting method and system comprising; establishing a known cam shaft orientation; assuring a valve seated condition; advancing the threaded adjusting device in the direction which eliminates lash; continuously monitoring the valve seated condition by sensing means and determining the initial point of movement of the valve; creating a zero reference signal in response to arrival at the initial point of movement, rotating the threaded adjusting device by a predetermined amount of rotation in response to the zero reference signal; creating a stop signal in response to arrival at the predetermined amount of rotation; and securing the threaded adjusting device in response to the stop signal.

DESCRIPTION OF THE PREFERRED EMBODIMENT

Figure 1:
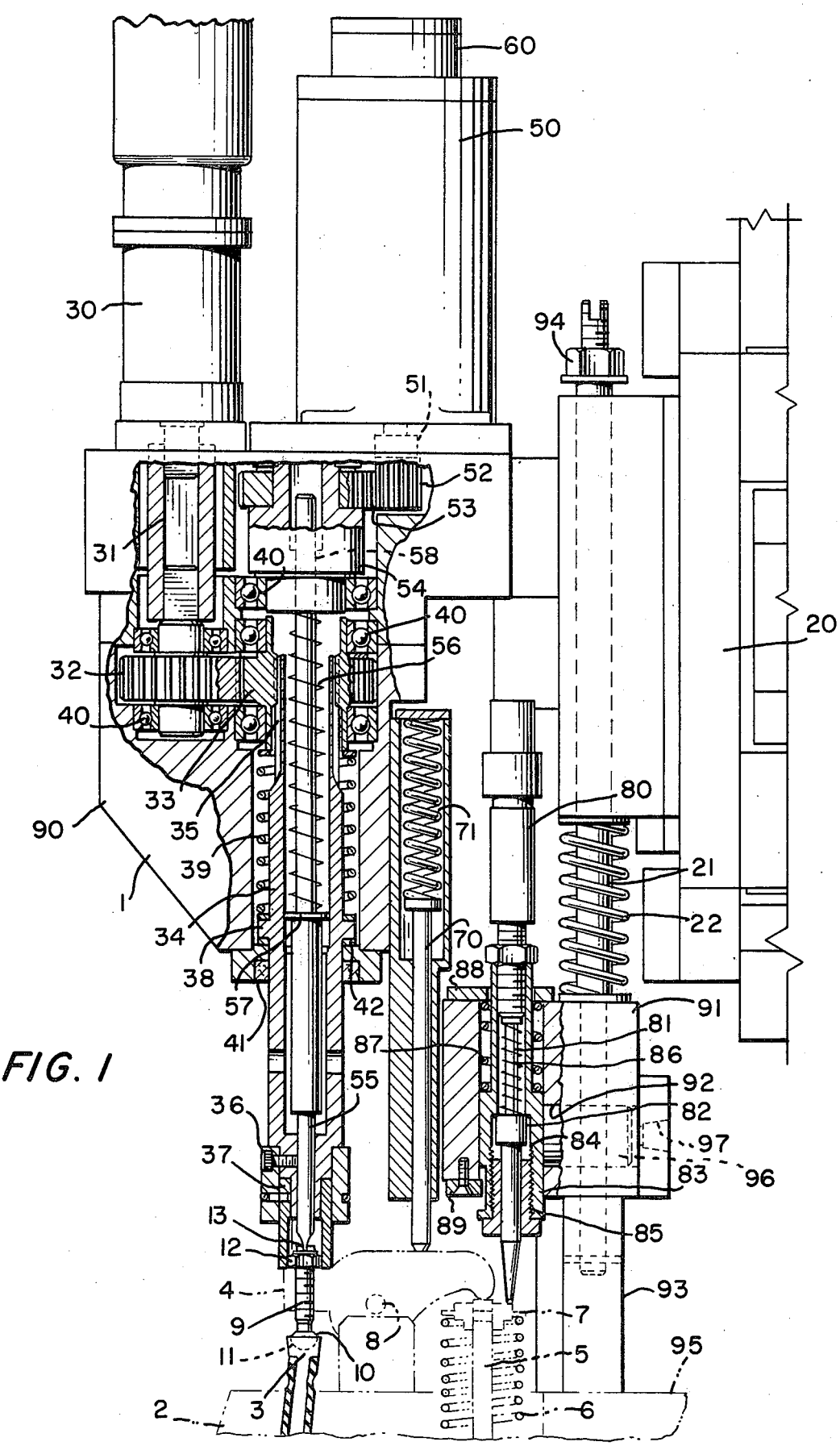
FIG. 1 is an elevation view of the valve lash adjusing tool of this invention showing parts in cut-away view.

The operation and description of the invention in the form of the preferred embodiment shown in the drawings may be best understood by referring to FIG. 1 for general assembly and for operation of the related parts. The valve lash adjusting tool 1 is shown in position for adjusting valves over a typical cylinder head 2 of an engine. The cylinder head would normally be provided with a cam shaft (not shown) which would in turn operate a tappet or push rod operating device (not shown). The tappet would in turn operate a push rod 3, a rocker arm 4, a valve stem 5, and finally an exhaust or intake valve (not shown). The valve is retained normally in its closed position by means of a valve spring 6 which forces the valve closed through a spring retainer 7. The rocker arm 4 is pivotally mounted at point 8 and is free to rotate to depress the valve stem 5 when the push rod 3 is actuated to its up position by the tappet and cam shaft. The rocker arm 4 is also provided with a valve lash adjusting screw 9 which has a ball end 10 which cooperates with a ball socket 11 in the push rod 3. The valve lash adjusting screw 9 is threadly engaged in the rocker arm and is provided with a lock nut 12 and a driving slot 13.

A mounting bracket 20 is part of the overall assembly machinery which is utilized to position the engine and the valve lash adjusting tool in proper relative position. The valve lash adjusting tool itself has four major components: The lock nut release and tightening unit, the adjusting screw rotation and positioning unit, the rocker arm positioning device, and the valve movement sensing unit.

Taking each major component in order, the lock nut release and tightening unit is composed of an air motor 30 having an output spindle 31 which drives a spur gear 32 which in turn drives a second spur gear 33 which in turn drives an output shaft 34 through a spline 35. A socket holding device 36 is attached to the output shaft 34 and secures the socket 37 to the output shaft. When the valve lash adjusting tool is in position, the socket 37 engages the locket nut 12 as shown on FIG. 1. The air motor 30 is capable of reversing operation to altervatively unlock and lock the lock nut 12. The output shaft 34 is further provided with a means for compensating for relative vertical movement of the output shaft. The means includes a spline 35, a land 38, and a spring 39. The function of these parts should be obvious to one skilled in the art of machine tools. All of the shafts and gears are suitably supported by means of ball bearings 40, a sleeve bearing 41, and a thrust washer 42.

The adjusting screw rotation and positioning unit is composed of a stepping motor 50 having its output on a spindle 51 which in turn drives a spur gear 52, and the spur gear 52 in turn drives a spur gear 53 which is in driving engagement with the screw adjusting bit support holder 54. The adjusting screw bit 55 is inserted in and is in driving engagement with the holder 54. The adjusting screw bit 55 is also provided with means for allowing relative vertical movement between bit and the valve adjusting unit, the means consisting of a spring 56, a washer 57, and a bit spline 58. The stepping motor 50 also drives an angular position encoder 60.

The rocker arm positioning device which holds rocker arm 4 in contact with valve stem 5 maintaining angular alignment of adjusting screw 9 with adjusting screw bit 55 is comprised of a suitably guided plunger 70 which produces a relatively constant downward force on the rocker arm 4 when the valve lash adjusting unit is in position. The relatively constant downward force is provided by a spring 71.

The final major component is the valve movement sensing unit which is composed of a Linear Variable Differential Transformer (LVDT) 80 having a sensing element 81 which activates the LVDT. A valve position plunger 82 communicates movement between the valve spring retainer 7 and the sensing element 81. The LVDT 80 along with the sensing unit 81 and the valve position plunger 82 are mounted in axial alignment in a sliding bushing 82. The LVDT 80 is threadingly engaged in the sliding bushing 83 at its top end. The valve position plunger 82 is retained within a bore 84 in the sliding bushing 83 and is restrained within that bore by a threaded bushing 85. Constant downward force on the valve position plunger 82 is provided by a spring 86 and, in addition, the constant downward force is provided on the sliding bushing 83 by mans of a bushing spring 87.

All of the major components of the valve lash adjusting tool are mounted on or in housing 90 which carries each of these components and retains them in their relative operating positions except as noted for the LVDT mounting and compensation vertical movement of th components. The sliding bushing 83 is retained in carrier 91 by means of a collar 88 and keeper 89. Carrier 91 is attached to dual guide bars 21 which slide axially in bores of mounting bracket 20. Carrier 91 is spring loaded down by spring 22 so foot 93 mounted to carrier 91 is registered on cylinder head 2. Guide bars 21 are restrained in mounting bracket 20 by nuts 94. Locking piston 96 in cylinder bore 92 of carrier 91, locks sliding bushing 83 in a fixed relationship with housing 91 when air pressure is applied to locking piston 96 through port 97. Foot 93 contacts reference surface 95 of cylinder head 2 providing a fixed relationship between transducer carrier 91 and the cylinder head 2. The other components are attached by means of suitable fastening units which are not shown to improve clarity of the drawings.

Figure 2:
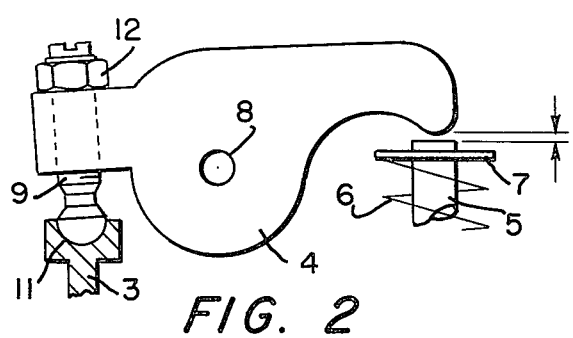
FIG. 2 is an elevation view of the valve rocker arm assembly showing portions of the valve train.
Figure 5:
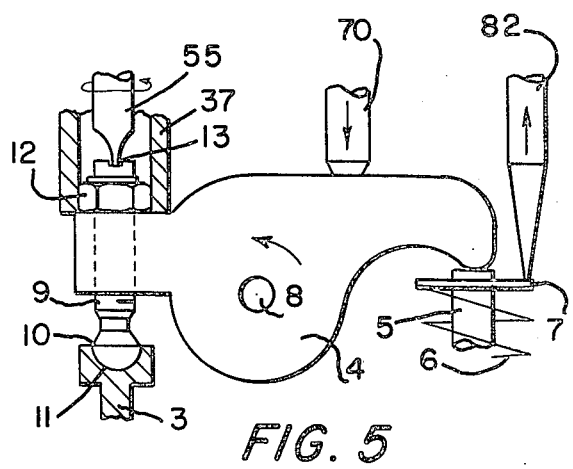
FIGS. 3 through 7 are elevation views of the rocker arm assembly showing the sequence of operation of the valve lash adjusting tool.
Figure 3:
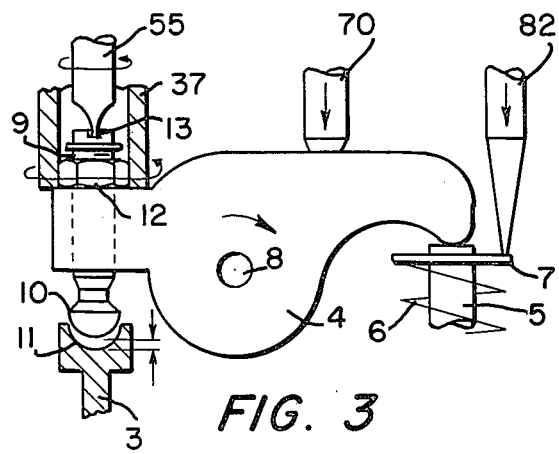
Figure 6:
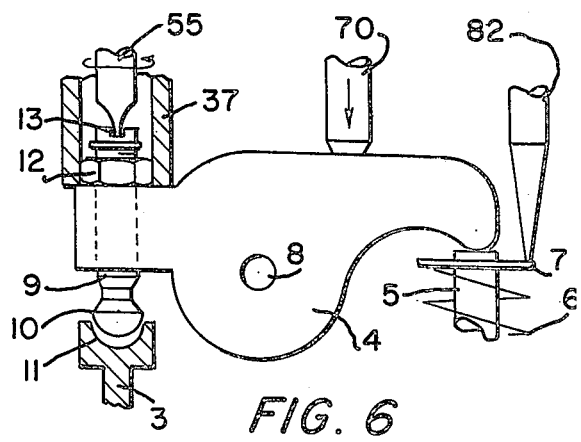

For purposes of describing the operation of the preferred embodiment, FIGS. 2 through 7 will be referred to in order. We will assume that the engine block has been assembled and that prior to its transfer to the valve lash adjusting station it is indexed with the valves to be adjusted having their cam lobes in the dwell position relative to the lifter. Upon reaching the valve lash adjusting station, a crankshaft rotation and stop means is advanced to engage the crankshaft and hold its position. The mounting bracket 20 is advanced to engage the valve lash adjusting tool with the appropriate rocker arm assembly. For example, assuming we have 8 cylinders with a firing order of 1 5 4 2 6 3 7 8, the valve lash adjusting tool might contact the exhaust valve for cylinder 7, the inlet valve for cylinder 5, or in the inlet valve for cylinders 1 or 2. Of course, multiple units might be utilized to contact all four of these valves. Once the valve lash adjusting mechanism has been moved firmly in contact with the rocker arm assembly, the rocker arm positioning device causes the rocker arm to seat against the valve stem 5 by means of a force exerted by the plunger 70. FIG. 2 shows the rocker arm assembly as it might be when the engine block arrives at this work station. FIG. 3 shows the valve lash adjusting mechanism in place just prior to the adjusting sequence. It shows the rocker arm 4 rotated about the pivot point 8 in contact with the valve stem 5. The valve position plunger 82 is shown in contact with the valve spring retainer 7 and had been moved to a mechanical zero position against sring 86, sliding bushing 82, and compressing bushing spring 87. In addition, the socket 37 is shown in engagement with the lock nut 12 and the adjusting screw bit 55 is shown in contact with the driving slot 13 of the adjusting screw 9. In FIG. 3, the ball end 10 is shown pulled out of the ball socket 11 a definite amount. This may or may not be the case when the valve lash adjusting tool is first engaged. However, to insure this condition, the air motor 30 is driven clockwise thereby driving the socket 37 counter clockwise to unlock the lock nut 12. Next, the stepping motor 50 rotates clockwise thereby driving the adjusting screw 9 counter-clockwise for a total of 5 turns. This is sufficient to assure a lash clearance condition in the valve linkage train using normal manufacturing tolerances. At this point, the sliding bushing 83 which carries the LVDT 80 is secured from movement by air pressure applied to locking piston 96. The LVDT 80 is then zeroed out electrically and is ready to sense any movement of the spring retainer 7.

Figure 4:
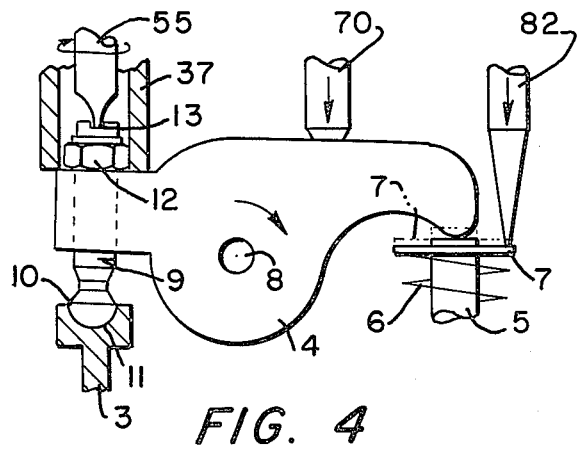
Figure 7:
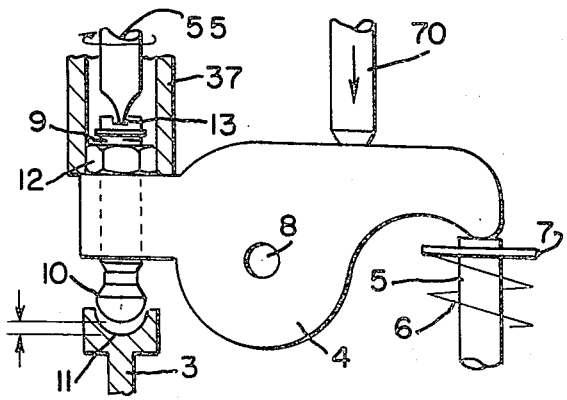

At this point, the stepping motor 50 rotates counter-clockwise driving the threaded adjusting device or valve adjusting screw 9 clockwise in until its ball end 10 is engaged in the ball socket 11. As the adjusting screw 9 is continued to be rotated in, it causes the rocker arm 4 to be rotated clockwise about its pivot 8 as shown in FIG. 4. The LVDT senses the initial valve movement (from zero position) and the stepping motor is allowed to continue to drive the adjusting screw clockwise until the transducer senses a total movement of approximately 0.2 of a millimeter at which point, a signal is produced by the transducer circuitry and in response to the signal the stepping motor 50 is stopped and reversed. The adjusting screw is then driven counter-clockwise back to the zero backlash position as sensed by the LVDT (See FIG. 5). At this point, a second signal produced by the transducer circuitry activates the angular position encoder for angular measurement of the adjusting screw rotation. The amount of rotation is measured by counting output pulses of the angular position encoder. The stepping motor rotation is continued rotating adjusting screw 9 counterclockwise from the zero position while monitoring the number of degrees of rotation (encoder pulses). The stepping motor continues to rotate until a specified number of degrees of rotation has been reached (See FIG. 6). At this point, a third signal is produced by the encoder circuitry. This signal is utilized to stop the stepping motor and initiate the securing of the adjusting screw (See FIG. 7).

In the above manner, using the adjusting screw as a micrometer, the correct valve lash (indicated at the ball socket by 2 opposing arrows) has now been set. A pneumatic brake (not shown) is applied to secure the rotation of the screw adjusting bit 55 to make sure that the lash setting is not distrubed while tightening the lock nut 12. Air motor 30 is now driven counterclockwise and driving the socket 37 clockwise and hence the lock nut 12 clockwise until it is secured. The valve lash adjusting tool is then retracted on a slide (not shown) thereby disengaging the valve lash adjusting tool. The first sequence of valve lash adjustment has now been completed. The crankshaft rotation and stop mechanism is activated, and the crankshaft is rotated to the appropriate position for adjusting of another series of valves. For example, the number 8 cylinder exhaust valve, the number 6 cylinder inlet valve, the number 3 cylinder inlet valve, and the number 4 cylinder inlet valve. The above cycle of valve lash adjusting is then repeated and thereafter the entire cycle is repeated twice more, assuming the use of four valve lash adjusting tools to complete adjustment of the 16 valves.

It should be obvious to one skilled in the art that the valve adjustment sequence may be carried out by a single valve adjusting tool operating individually on one valve at a time. For the preferred embodiment, we have chosed to indicate the use of four valve adjusting tools at one time as this is considered the most practical situation from a space limitation standpoint, and also works out conveniently from a crankshaft/cam shaft positioning sequence.

It should be obvious to one skilled in the art that the methods of driving the tool, the means of mounting the tool, and the means of accomplishing relative movement of the various components are optional. Of course, the lock nut is optional on valve adjusting screws and hence the apparatus to unlock the lock nut is optional. The movement compensating features are for the most part optional, and the means for determining the angular rotation of the adjusting screw are optional. For example, the following options may be employed: A mechanical means such as a clutch and rotation limiting device might be used to obtain a given amount of rotation of the lash adjusting screw once the adjusting screw has been backed out to the zero lash condition; that is, instead of activating the angular position encoder 60, a clutch means might be engaged which would apply a mechanical stop after a specified number of degrees of rotation.

In the alternative a device with a known angular output may be utilized to rotate the adjusting screw. For example, a stroke limited rack and pinion may be coupled to the screw adjusting bit by means of a cluth device. Once the zero reference is established, the rack is stroked resulting in a known angular rotation out of the adjusting screw. The rack and pinion rotation device may be considered to be schematically shown on FIG. 1 at reference numeral 60. The function of a rack and pinion device and its design as a rotation limiting device is well-known in the art, and its function here is to serve as a device to establish a known amount of rotation thereby essentially performing the function of angler position encoder 60. The rocker arm positioning device (plunger 70, spring 71, etc.) is considered optional. Also the placement of contact plunger 82 in relation to the spring retaining washer 7 or the end of the rocker arm stem is considered optional, although the position shown in the preferred embodiment is considered to be convenient.

Several methods of determining the zero reference point of valve movement are possible such as pressurizing or pulling a vacuum on the valve port and determining when the valve begins to open by leakage. Optical methods may also be employed. However, the use of the LVDT is convenient and provides exceptional accuracy.

It should be obvious to one skilled in the art that the above-described apparatus is adaptable to other linkage adjusting devices commonly employed for adjusing valve lash such as the threaded stud center nut adjusting device.

An important aspect of the invention described above is the accomodation made to prevent a stack up of tolerances from interfering with the use of the adjusting screw as a micrometer. Of particular importance is the full seating of the valve train by depressing the valve spring by means of the adjusting screw and linkage after establishing an electrical zero for a fully seated valve. Utilizing this method, the adjusting screw is backed out under load to the established zero and rotation is accurately sensed to establish the proper lash without the tolerance problems associated with instantaneous shutdown and rotation reversal.

The valve lash adjusting tool described above can also be utilized to set the preload on valves activated by hydraulic valve lifters. In this case, sufficient accuracy can usually be obtained in preload by simply continuing to run in the adjusting screw a prescribed amount of rotation once valve movement is sensed.

We do not wish to be limited to the details of the preferred embodiment shown except as limited by the scope of the claims. We have thoroughly described the specific embodiment in so far as it is required to understand the nature and extent of our invention. Details of the electronic control package and the supporting assembly features have been omitted as these are considered optional and well within the knowledge of one skilled in the art of machine function, control, and assembly line manufacture once the nature of our invention is understood.

I claim:

1. A method of engine valve linkage adjustment comprising:
   establishing a known cam shaft orientation;
   assuring a valve seated condition;
   advancing the threaded adjusting device in the direction which eliminates lash;
   continuously monitoring the valve seated condition by sensing means and determining the initial point of movement of the valve;
   creating a zero reference signal in response to arrival at said initial point of movement;
   retracting said threaded adjusting device by a predetermined amount of rotation in response to said zero reference signal;
   creating a stop signal in response to arrival at said predetermined amount of rotation; and stopping said threaded adjusting device in response to said stop signal.

2. The method of claim 1 further comprising the additional steps of:
after determining the initial point of movement of the valve, determining when said valve moves a predetermined amount and creatng a movement signal in response to said predetermined amount of movement;
stopping the addvancing of said threaded adjusting device in response to said movement signal; and
retracting said threaded adjusting device until said valve returns said predetermined amount of movement.

3. The method of claim 1 wherein:
the engine crankshaft is rotated to establish a known cam shaft orientation.

4. The method of claim 1 wherein:
the threaded adjusting device is screwed out a predetermined number of turns to assure a valve seated condition prior to advancing the threaded adjusting device in the direction which eliminates lash.

5. The method of claim 1 further comprising the steps of:
unlocking the threaded adjusting device lock nut prior to assuring a valve seated condition; and
locking the adjusting screw lock nut after the threaded adjusting device has been stopped.

6. The method of claim 1 further comprising the step of:
applying a force to rotate the rocker arm in contact with the valve stem and retain the rocker arm in contact with the valve stem during the linkage adjustment.

7. The method of claim 1 wherein:
monitoring of valve seated condition is by creating a pressure differential access the valve and checking for leakage and determining the initial point of movement of said valve is by detection of start of flow through the valve port.

8. Apparatus for automatically setting valve linkage adjustment in an internal combustion engine comprising:
a mounting means for the apparatus;
rotating means for adjusting the valve linkage threaded adjusting device;
sensing means for determining movement of the valve; and
rotation limiting means in operating relationship with said rotating means for determining the amount of rotation of said rotating means, said rotation limiting means being activated in response to said sensing means determining a valve position.

9. The apparatus of claim 8 wherein:
said rotating means comprises a reversible drive stepping motor in driving contact with said threaded adjusting device.

10. The apparatus of claim 8 wherein:
said sensing means comprises a linear variable differential transformer in operable contact with the valve.

11. The apparatus of claim 10 wherein:
said linear variable differential transformer is slidably mounted in said mounting frame and is provided with a locking means to secure its mechanical zero position once engagement with an engine is made.

12. The apparatus of claim 8 wherein:
said rotation limiting means comprises an angular position encoder activated in response to a known valve position and initiating a signal to cease rotation of said rotating means once said threaded adjusting device has been rotated through a set angle to establish valve linkage adjustment.

13. The apparatus of claim 8 further comprising:
means to unlock the adjusting screw lock nut prior to operation of said rotating means and lock the threaded adjusting device lock nut after the valve is set.

14. The apparatus of claim 8 further comprising:
means to assure contact of the valve rocker arm with the valve continuously during the period of valve linkage adjustment.

15. The apparatus of claim 8 further comprising:
means to position said mounting means in operating relationship with the valve train linkage; and
means within said mounting means to compensate for alignment inaccuracies and relative movements experienced during the valve linkage adjusting cycle.

16. The apparatus of claim 8 wherein:
said means to unlock the threaded adjusting device lock nut comprises a separate drive motor arranged to drive a spindle and socket concentric with said rotating means.

17. The apparatus of claim 16 wherein:
said separate drive motor is a reversing stall type ar motor.

18. The apparatus of claim 8 wherein:
said rotation means for the threaded adjusting device includes a driving bit which cooperates with a slot in said threaded adjusting device to drive said device.

19. The apparatus of claim 8 wherein:
said rotation limiting means comprises a rack and pinion drive.

20. A valve lash adjusting apparatus for internal combustion engines of the automotive type having a conventional valve train including at least a cam shaft, rocker arm valve and valve lash adjusting screw comprising:
a sliding mounting bracket for support of the apparatus in operating relationship with the engine valve train;
a lock nut release and tightening unit mounted on said mouning bracket;
an adjusting screw rotation and positioning unit mounting on said mounting bracket;
a rocker arm positioning device mounted on said mounting bracket; and
a valve movement sensing unit mounted on said mounting bracket, said valve movement sensing unit having a transducer providing a voltage differential with movement.

* * * * *